March 17, 1936. J. V. JARDINE 2,034,396
FAUCET RESEATING TOOL
Filed Jan. 29, 1934
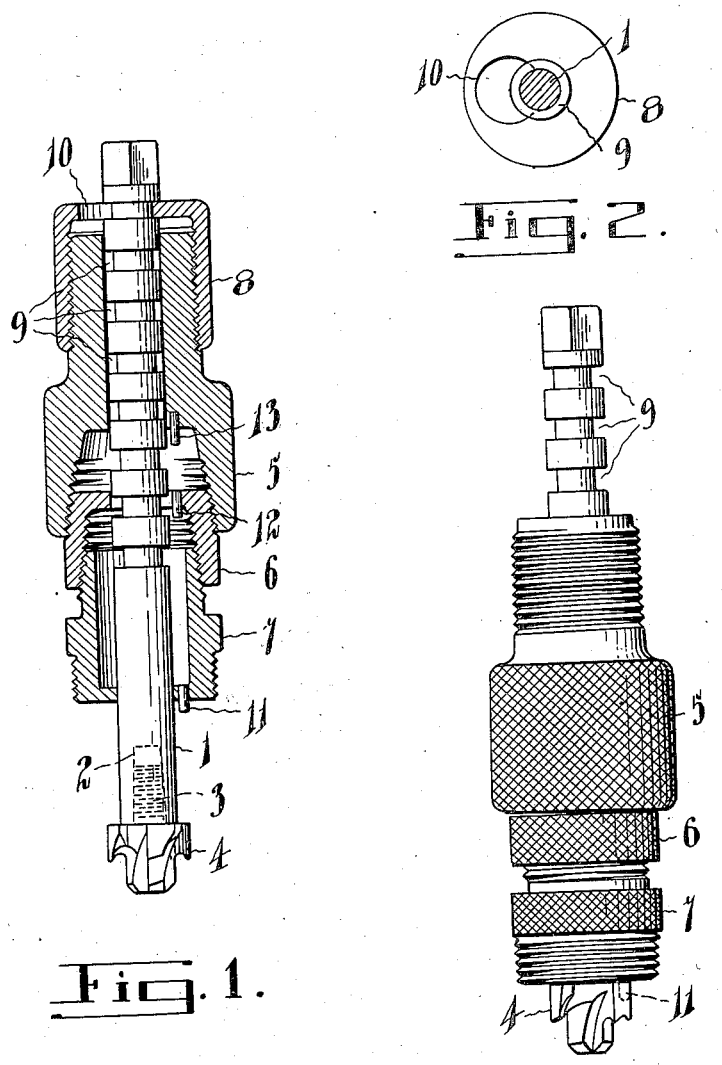
Inventor
J. V. Jardine Patented Mar. 17, 1936

2,034,396

UNITED STATES PATENT OFFICE 2,034,396

FAUCET RESEATING TOOL

James Valtin Jardine, Hespeler, Ontario, Canada

Application January 29, 1934, Serial No. 708,828

1 Claim. (Cl. 90—12.5)

This invention relates to tools for regrinding or resurfacing the vlave seats of taps or faucets, and my object is to provide a tool with a series of adapters by means of which the tool may be used for a large range of taps or faucets. A further object is to provide simple means for removing the cutter without damage when it is desired to replace it with a cutter of another size.

I attain my objects by means of the constructions hereinafter described and illustrated in the accompanying drawing in which Fig. 1 is a vertical section of my improved tool with its complete set of adapters in position;

Fig. 2 an end view of the stem with the cap; and

Fig. 3 a view illustrating the method of removing the cutter from the spindle.

In the drawing, like numerals of reference indicate corresponding parts in the different figures.

1 indicates a spindle, one end of which has a threaded hole 2 to receive a threaded pin 3 on a cutter 4. 5 is a body, the upper portion of which has an opening therethrough which is of a diameter to provide a snug sliding fit on the spindle 1, while the lower portion of the body is of greater internal diameter and provided with an internal tapered thread.

Threaded into the lower part of the body is an adapter 6, which adapter is also internally threaded to receive a further adapter 7. This adapter 7 is provided with an external thread adjacent its lower end.

The upper portion of the body is externally threaded to receive a cap 8.

The spindle is provided with a plurality of spaced annular grooves 9. The cap is provided with an opening 10 in the head thereof of keyhole shape, the enlarged portion of the opening being of a size to receive the spindle, while the narrow portion is only of a size to receive a grooved portion of the spindle. The narrow portion of the opening 10 is arranged concentrically with the normal position of the spindle, while the large portion is eccentric thereto.

It will be noted that the adapter 7 has a pin 11 projecting from its under surface, the adapter 6 an internal pin 12 projecting from its head in a direction parallel to the spindle, and the body 5 a pin 13 arranged similar to the pin 12.

The spindle 1 is provided with a squared head to be engaged by a wrench or other tool.

The device is used as follows. Assuming the faucet the seat of which is to be reground or resurfaced is of the type having a female thread, the device is used as shown in Fig. 1, the externally threaded portion of the adapter being engaged with the thread of the faucet and the cap adjusted into engagement with the proper groove in the spindle, any intermediate adjustment to engage the cutter with the seat being taken care of by the extent to which the cap is threaded on to the body. The spindle is then rotated by means of a suitable tool to resurface the seat.

When the seat has been corrected, the tool is removed by simply disengaging the adapter from the faucet body.

Assuming it is desired to remove the cutter to replace it with a new one or one of another size, the cap is disengaged from the body, which allows the spindle to be retracted to engage the pin 11 on the adapter 7 in one of the flutes in the cutter, and then by turning the spindle with a suitable tool while holding the body stationary, the cutter is removed. It will thus be seen that the cutter may be removed without engaging it with pliers or other tool liable to damage its cutting edges.

Assuming the faucet body is of comparatively small size and provided with a male thread, the adapter 7 is removed from the tool, and the adapter 6 engaged with the faucet body. The cap is then adjusted in the same manner as previously described and the resurfacing of the seat then proceeded with. The adapter 6, as before stated, is provided with a pin 12 for use in removing the cutter when it is desired to do so.

If the faucet is of a larger size, the adapter 6 is also dispensed with and the internal thread on the lower part of the body is engaged with the faucet body. It is, as before stated, provided with a pin 13 for engagement in the flutes of the cutter to assist in the removal of the latter.

The tapered internal threads of the body 5 and adapter 6 provide for the taking care of a comparatively large range of faucet sizes.

From the above description it will be seen that I have devised a tool which will satisfactorily attain the object of my invention as set out in the preamble of this specification.

What I claim as my invention is:—

In a faucet reseating tool, the combination of a body member adapted to be engaged with a faucet body; a spindle slidable longitudinally of and rotatable in said body; a cutter member of greater diameter than and threaded on the end of the spindle, said cutter member having flutes in its periphery; and a pin carried by said body member extending parallel to the spindle and adapted to be engaged in a flute in the cutter to hold the cutter from rotation relative to the body member while the spindle is rotated.

JAMES VALTIN JARDINE.